MAGNETIC HEAD AND DRUM MEMORY SYSTEM

Filed June 16, 1958 3 Sheets-Sheet 1

INVENTORS:
Russell D. Ricketts
Claus O. Silldorff
By Richard K. Ehrlich
Attorney March 10, 1964 R. D. RICKETTS ETAL 3,124,788
MAGNETIC HEAD AND DRUM MEMORY SYSTEM
Filed June 16, 1958 3 Sheets-Sheet 2
Fig. 3
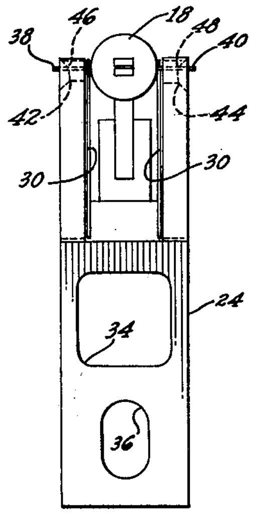
Fig. 4a
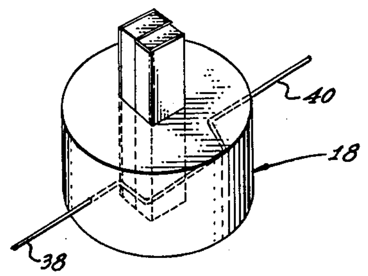
Fig. 4b
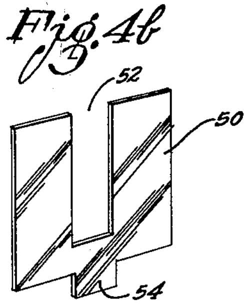
Fig. 4c
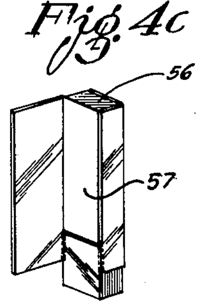
Fig. 4d
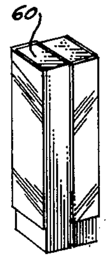
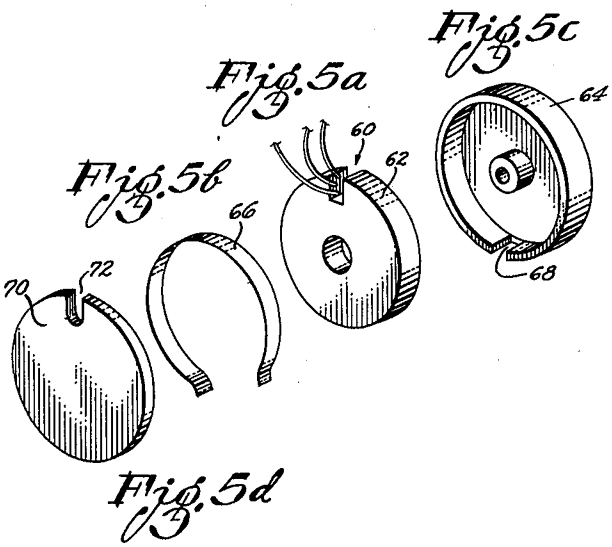
Fig. 5a, Fig. 5b, Fig. 5c
Fig. 5d
INVENTORS:
Russell D. Ricketts
Claus O. Silldorff
By Richard K. Ehrlich
Attorney

MAGNETIC HEAD AND DRUM MEMORY SYSTEM

INVENTORS:
Russell D. Ricketts
Claus O. Silldorff

By Richard K. Ehrlich
Attorney 3,124,788
Patented Mar. 10, 1964

3,124,788
MAGNETIC HEAD AND DRUM MEMORY SYSTEM

Russell D. Ricketts, Woodland Hills, and Claus O. Silldorff, Venice, Calif., assignors to Litton Industries of California, Beverly Hills, Calif.

Filed June 16, 1958, Ser. No. 742,179
8 Claims. (Cl. 340—174.1)

This invention relates to a magnetic drum memory system and more particularly to magnetic drum memory system utilizing a rotatable magnetic transducer which is capable of radial translational movement and is able to engage the drum periphery in a predetermined manner despite irregularities therein.

In numerous electronic systems it is frequently necessary to store or remember intelligence information presented as a continuously variable electrical signal in time, and to play back the information at a subsequent point in time for comparison with other signals or for other operational purposes. In the fields of high speed digital computation, pulse code communication, and information correlation in particular, the foregoing storage requirements are further complicated by the fact that the stored information must be periodically presented at cyclically repetitive points in time, and with relatively short access times, the term access time being utilized in the art to denote the maximum interval which must be waited before the desired information is again presented at the output of the memory unit.

As a result of the foregoing factors, it has become common practice to employ as a memory unit a rotatable drum whose periphery is magnetizable, and a plurality of magnetic writing and reading transducers positioned adjacent the periphery of the drum for sequentially writing signals on the drum or for reading signals from the drum; the terms writing and reading respectively denote the conversion of applied electrical signals to magnetized cells on the drum, and the generation of electrical output signals corresponding to the magnetization of the cells passing beneath a transducer. For purposes of simplicity, the term recording will hereinafter be considered generic to both reading and writing operations, since in practice a transducer may be utilized to either read or write, as desired, and the functional use implies no structural difference.

In its most common form, a magnetic drum memory unit employs a drum whose periphery is coated with either iron oxide or nickel-cobalt, and one or more transducers which are spaced from the drum periphery by several thousandths of an inch. The transducers are also usually positioned axially, with respect to the drum, over one or more parallel tracks or channels on the drum, where the term track or channel denotes a reference circle on the drum periphery which continuously passes beneath the transducers associated with that particular track. In the prior art several different forms of magnetic transducers have been found acceptable for use with magnetic drums, the most common form being a horseshoe-shaped core of magnetic material which carries an electrical coil or winding remote from the core gap, the gap in the core being positioned axially and adjacent the associated drum track. In writing signals on the drum, therefore, energization of the transducer winding creates a magnetic field at least part of which bridges the core gap by way of the adjacent drum periphery. Conversely, in reading signals from the drum, a portion of the flux produced by the magnetized cells on the drum channel bridges through the transducer core and thereby generates an electrical output signal in the associated transducer winding.

Although magnetic drum memory systems of the prior art perform satisfactorily in most applications, they still have a number of serious limitations. Firstly, in prior art non-contact transducer heads, the positioning of the transducer heads adjacent the drum is difficult since the transducer heads must be positioned over the desired tract on the drum and must be radially spaced from the drum periphery within one or two thousandths of an inch. A second disadvantage of prior art non-contact transducer heads is that the magnetic drum must be precision ground so that eccentricity or run-out is limited to a few ten-thousands of an inch, the reasons for this requirement being that eccentricity causes the drum-to-head spacing to vary as the drum is rotated, which varies the recording resolution and magnetization, and amplitude modulates the playback signal. Still another disadvantage of non-contact transducer head recording is the fact that the maximum resolution in terms of cell density per unit length of drum, and for a given signal-to-noise ratio, is relatively low because the magnetic flux which bridges the core gap is effective over a length of the drum surface which is considerably larger than the core gap itself. This disadvantage is inherent in a non-contact head recording system since the head is spaced from the surface of the drum.

In the prior art, in order to overcome the limitations of non-contact recording systems an air floating transducer head has been used. For example, such a floating head has been designed for the Univac-Larc computing system and is described on page 125 of the December 10–12, 1956 Report of Proceedings of the Eastern Joint computer Conference in an article entitled, "A Large-Capacity Drum-File Memory System" by H. Welsh and V. Porter. In this system the head is floated on a wedge of air which is drawn along with the rotating drum by surface friction. Self alignment of the head with the drum surface is accomplished by gimbals which allow the head to rotate about three axes.

However, a number of serious limitations exist in this type of prior art magnetic memory system also. Firstly, before the drum comes up to speed or when it slows down the head will be dragged over the surface of the drum, thereby damaging the head and magnetizable surface of the drum unless measures are taken to avoid this difficulty. In the Larc system, complicated, expensive and relatively heavy apparatus for supporting the head during the period when the drum is not up to speed is utilized to keep the head off the surface of the drum during the aforementioned periods.

Secondly, because of the size of the jewel and pivot bearings used in construction of the gimbals it is physically impossible for the head to be placed relatively close to the surface of the drum. Therefore, resolution in terms of cell density per unit length as well as signal-to-noise ratio are low. In addition, the size of the jewel and pivot bearings prevents the axis of axial rotation of the head from being close to or at the surface of the drum. Hence, the moving wedge of air tends to rotate the head so that the forward portion of the head is forced against the drum.

Still another limitation of the floating head system is the fact that it depends upon air for its operation. In many airborne applications of magnetic memory systems air is not readily available since the vehicle containing the system may be operating at points where the atmospheric pressure is substantially reduced. A further limitation in floating heads of the Larc type is found in the fact that the gimbals allowing the head to rotate are expensive, complicated, bulky, and relatively heavy. A still further limitation of the Larc gimbal system is that the head does not maintain a fixed circumferential position as it rotates so that this system is not suitable for use in a memory system that is to be operated as a recirculating register.

In order to overcome the foregoing enumerated limitations of non-contact and floating heads a number of different types of contact heads have been developed. However, prior art memory systems employing contact heads have been found to be limited in their operation also. For example, it has been found that environmental shocks as well as drum eccentricity or run-out tends to give the transducer head a radial acceleration that causes the head to jump off the surface of the drum so that bits of information are lost. To try and overcome this problem the head is urged against the surface of the drum with a force, usually provided by a spring, a number of times greater than the weight of the head. The pressure exerted against the surface of the drum, due to the weight of the head and the aforementioned force, is substantial since the area of the head in contact with the surface of the drum is small. It has been found that the frictional force due to this substantial pressure exerted against the surface of the drum tends to wear away the magnetizable surface thereon, thereby limiting the life of the drum.

It would seem to one not skilled in the art that the problem of wear could be solved by increasing the area of the head in contact with the surface of the drum. However, this would be impossible in prior art contact heads because they are not self-aligning with the drum surface, and therefore would have a tendency to ride on one of the bottom edges of a large area head, thereby affecting the operation of the head since the head gap would be lifted off the surface of the drum on the one hand and the edge of the head would seriously damage the drum surface on the other.

A still further limitation on prior art contact heads is the fact that as the head changes radial position to accommodate for drum eccentricity or run-out the alignment of the head with respect to the surface of the drum changes so that only a portion of the bottom side of the head is in contact with the surface of the drum and hence the head gap is positioned off the drum, and furthermore, the gap is not radially aligned with the drum. This again causes the operation of the head to be affected and limits the recording resolution of the memory system.

In the prior art, one type of contact head that has minimized the foregoing limitations of contact head recording is disclosed in copending U.S. patent application, Serial No. 604,947 for "Magnetic Drum Memory System" filed on August 20, 1956, by D. L. Curtis and R. B. Larsen now Patent Number 2,931,691. Briefly, Curtis and Larsen disclose a contact head which comprises a miniaturized core having a gap therein. The head is held in continuous contact with the surface of an associated drum by at least one conductive cantilever spring which also electrically connects the head.

The Curtis and Larsen head has proven itself to be one of the most useful recording heads known in the prior art. However, it too has a few limitations. Firstly, because the head is normally supported by two relatively long cantilever springs which are circumferentially oriented, it is difficult to align the head so that the gap therein is perfectly axially aligned. Secondly, the cantilever springs have a coefficient of thermal expansion which differs from that of the drum so that as the temperature of the memory system increases the circumferential positioning of the transducer heads changes. Hence, if it is desired that the memory system function as a recirculating register or other similar device where it is necessary to position two heads a predetermined distance apart the two heads must be mounted in such a manner that the springs cantilever in the same direction or the distance between the heads will change with temperature.

It is apparent from the foregoing, that prior art magnetic drum memory systems could be substantially improved by the development of a contact head which remains seated against the surface of the drum despite radial accelerations imparted to the head due to run-out of the drum or environmental shocks and yet does not excessively wear away the magnetizable surface of the drum. In addition, prior art magnetic drum memory systems could be substantially improved by the development of a contact head which is circumferentially fixed in position and self-aligning with the surface of the drum so that the head gap remains axially oriented and in contact with the surface of the drum despite irregularities therein.

The present invention provides a long life magnetic drum memory system which includes a magnetic transducer head with a gap therein which remains in contact with the magnetizable surface of the drum despite radial accelerations imparted to the transducer head due to run-out of the drum or environmental shocks and which is self-aligning with the surface of the drum so that the gap remains axially oriented and in contact with the drum.

In accordance with one of the basic concepts of the invention a constraining surface and the motion of the rotating drum constrain the transducer head from moving circumferentially while permitting the transducer head to move radially and to rotate about a circumferentially oriented axis and an axially oriented axis. The axially oriented axis is colinear with or near a gap line which is defined by the locus of contact of the gap and the surface of the drum.

Another feature of the invention resides in the use of a step-down transformer in the transducer which utilized a rigid U-shaped single turn secondary winding which is connected to the transducer head. The step-down transformer further includes a secondary winding which is wound on a ferrite core, the ferrite core having an aperture therein through which the base section of the U-shaped primary winding passes without contacting the ferrite core. The aperture is large enough to allow the primary winding to move freely therein without touching the ferrite core so that the freedom of movement of the transducer head is not thereby limited.

Still another feature of the invention resides in the use of two flexible conductive strips for electrically connecting a secondary winding of a step-down transformer with the transducer head. The flexibility of the conductive strips permits the transducer head to be electrically connected with the transformer without having its freedom of movement restricted.

According to two different embodiments of the invention a transducer mounting bracket has two radially oriented constraining surfaces coupled thereto while the transducer head has two colinear bars coupled thereto in such a manner that the axes of the bars lies in a radially oriented plane which includes therein the locus of contact of the head gap and the drum surface. The axes of the bars further lies substantially near or colinear with the locus. Each one of a pair of springs coupled to the transducer mounting bracket is slidably positioned against a corresponding one of the two bars thereby urging the transducer head against the surface of the drum and slidably positioning the bars against the constraining surfaces in one embodiment and solely urging the transducer head against the constraining surfaces in the other embodiment. In both of these embodiments the transducer head is free to rotate axially and circumferentially and to move radially and yet is constrained from translational circumferential movement from a predetermined circumferential position.

According to still another feature of the invention the bottom area of the transducer head is substantially increased so that the pressure exerted on the surface of the drum by the transducer head is thereby substantially decreased. It is evident that the reduction in pressure results in a magnetic drum memory system which has a much longer life expectancy than prior art drum memory systems.

It is, therefore, an object of the invention to provide a magnetic drum memory system wherein the associated transducer heads are constrained from circumferential motion.

It is another object of the invention to provide a magnetic drum memory system wherein the associated transducer head remain in contact with the magnetizable surface of the drum despite run-out therein or environmental shocks.

It is a further object of the invention to provide a magnetic drum memory system wherein the associated transducer head is pivotable about an axially oriented axis and a circumferentially oriented axis.

It is still another object of the invention to provide a magnetic drum memory system wherein the transducer head is free to move radially in order to accommodate for drum eccentricity or run-out.

It is still a further object of the invention to provide a magnetic drum memory system wherein the transducer head has a large bottom area in contact with the drum surface in order to substantially reduce the pressure thereon.

It is a still further object of the invention to provide a magnetic drum memory system wherein the associated transducer heads have a pair of colinear bars coupled thereto which are slidably positioned against a pair of radially oriented constraining surfaces for permitting the transducer head to be self-aligning with the drum surface.

It is another object of the invention to provide a magnetic drum memory system which includes a step-down transformer having a rigid U-shaped single turn secondary winding with its two legs connected to an associated transducer head and its base passing through an aperture in a ferrite core without contacting the core.

It is still another further object of the invention to provide a magnetic drum memory system wherein an associated transducer head is connected to a secondary winding of a corresponding step-down transformer by a pair of flexible conductors.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 1 is a view of a magnetic drum memory system, in accordance with the invention.

stator or frame member 10, a rotatable drum 12, which is

FIG. 3 is a bottom view of the transducer shown in FIG. 2.

FIGS. *4a–4d* are isometric views of a number of elements of a transducer head of one embodiment of the invention.

FIGS. *5a–5d* are isometric views of a number of elements of a cup-core transformer of one embodiment of the invention.

FIGS. *6a* and *6b* are isometric views of three elements of a transducer mounting bracket of one embodiment of the invention.

FIG. *7a* is an isometric view of a transducer of another embodiment of the invention.

FIG. *7b* is a bottom view of the transducer shown in FIG. *7a*.

FIG. *7c* is a view of the interior assembly of the transducer shown in FIG. *7a*.

Figure 1:
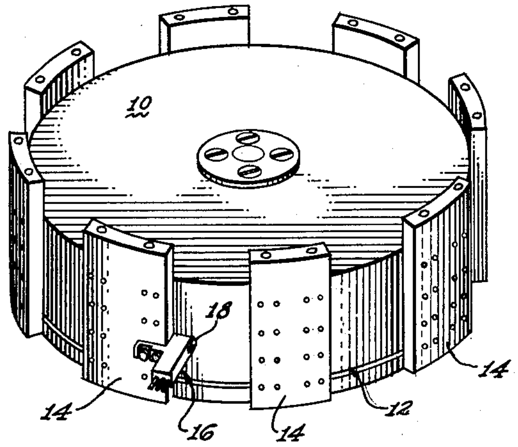

Referring now to the drawings, wherein like or corresponding parts are designated by the same reference characters throughout the several views, there is shown in FIG. 1 a magnetic drum memory system according to the invention. Basically, the memory unit comprises a stator or frame member 10, a rotatable drum 12, which is rotated by an associated motor, not here shown, a plurality of transducer mounting 14 which are disposed about the drum periphery, and one or more magnetic transducers, such as a transducer 16, which are mounted on preselected mounting stations and which include an active recording or reading transducer head 18. The cylindrical periphery of the drum, or in other words, the surface of the drum adjacent the transducer mounting stations, is preferably plated with nickel-cobalt to provide a relatively low permeability magnetizable storage system.

Figure 2:
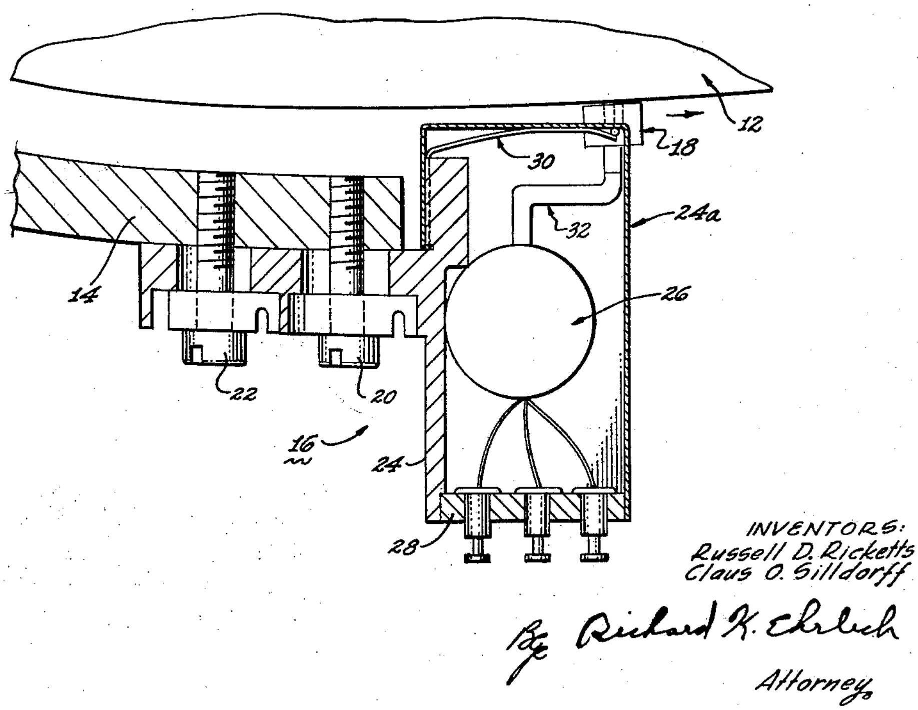
FIG. 2 is a detailed side view of a transducer and a portion of a drum of one embodiment of the invention.

Referring now to FIG. 2, there is shown a detailed side view of transducer 16 which discloses the manner in which the transducer is positioned with respect to drum 12. As shown in FIG. 2, transducer 16 is mounted to transducer mounting station 14 by means of two eccentric screws 20 and 22. As shown in FIG. 2, transducer 16 includes a transducer mounting bracket 24, a transducer mounting bracket cover *24a*, a step down transformer 26 having a primary winding and a secondary winding, a terminal board 28 having three terminals therein which are connected to the primary winding of transformer 26, transducer head 18, a pair of springs 30, which urge transducer head 18 against the surface of drum 12, and a pair of flexible conductors 32 for connecting transducer head 18 to the secondary winding of transformer 26.

Referring now in more detail to the mounting of transducer mounting bracket 24 to transducer mounting station 14, it will be shown that by rotation of eccentric screws 20 and 22 transducer 16 and thereby transducer head 18 can be axially and circumferentially aligned with respect to the drum. To better illustrate the manner in which transducer 16 is mounted so that it can be axially and circumferentially adjusted, attention is directed to FIG. 3.

In reference now to FIG. 3, there is shown a bottom view of transducer 16 wherein there is depicted a pair of slots 34 and 36 through which eccentric screws 20 and 22 pass, respectively. Slot 34 is a rectangular shaped slot which is substantially larger than the diameter of the shaft of eccentric screw 20 while slot 36 is an oval shaped slot whose long axis is orientated in such a manner that it will be circumferentially positioned when transducer 16 is properly mounted on transducer mounting station 14. Hence, when eccentric screw 22 which has an eccentrically mounted head is rotated the eccentrically mounted head will contact one of the two axially oriented sides of slot 36 and force transducer mounting bracket 24 and thereby transducer 16 circumferentially forwards or backwards, as shown in FIG. 2. Rotation of eccentric screw 20 which also has an eccentrically mounted head will cause transducer mounting bracket 42 and thereby transducer 16 to move axially across the surface of the drum since the eccentric head of the screw will contact the circumferentially oriented portion of the sides of slot 34. Therefore, by proper manipulation of eccentric screws 20 and 22, transducer head 18 can be selectively positioned both axially and circumferentially on the surface of drum 12.

Referring again to FIG. 3, it is clear that the bottom side of transducer head 18 is circular in shape and includes a ferrite core having a gap therein which is aligned with a pair of pivot bars 38 and 40 which protrude from transducer head 18. As indicated in FIG. 3, pivot bars 38 and 40 are colinear and extend into a groove 42 and a groove 44 in transducer mounting bracket 24, respectively. As is better shown in FIG. 3, grooves 42 and 44 are bounded by a pair of constraining surfaces 46 and 48, respectively.

Referring once again to FIG. 2, keeping in mind that each of springs 30 are disposed at opposite sides of transducer mounting bracket 24, it is clear that one end of each of springs 30 is positioned in a cavity within transducer mounting bracket 24 and one of the pair of springs 30 is slidably positioned above and against pivot bars 38 while the other of the pair of springs 30 is slidably positioned above and against the pivot bar 40, thereby urging the bottom side of transducer head 18 against the surface of drum 12, and, in addition, urging pivot bars 38 and 40 against constraining surfaces 46 and 48, respectively. It should be noted that the direction of rotation of drum 12, as indicated by the arrow in FIG. 2, also tends to urge pivot bars 38 and 40 against the constraining surfaces since the frictional drag of the rotating drum tends to move transducer head 18 and thereby pivot bars 38 and 40 in the direction of rotation of the drum.

Directing attention now to transfer head 18, there is shown in FIG. 4 a detailed isometric view of the transducer head. To better understand the structure of the head and one suitable method of fabrication thereof, attention is now directed to FIGS. 4*b* through 4*d*.

Referring now with particularly to FIG. 4*b*, there is shown a blank 50 of conductive material which is to be utilized as a single turn conductor for electrically energizing the contact head and for spacing a recording gap, the blank preferably being composed of a good conductor, such as solid silver, and being of the order of .5 mil in thickness. As indicated in the drawing, the top of the blank is reduced in a central region, as shown at 52, while the lower edge of blank 50 preferably includes a tab 54 in the central region.

In the fabrication of the transducer head, blank 50 is first placed against one side of a rectangular ferrite block 56 and is then wrapped around the block, as shown in FIG. 4*c*, so that the reduced central region of the blank faces on the front surface of block 56. As shown in FIG. 4*c*, a small strip of ferromagnetic material 57 is inserted in the reduced central region of block 50 while a second rectangular ferrite block 60 is pressed firmly against the front face of ferrite block 56, as shown in FIG. 4*d*. Thus, it will be seen that strip 57 and the ferrite blocks 56 and 60 form a U-shaped ferromagnetic core with the central region of conductor 50 filling the gap therein. A small dab of a suitable cement, such as resin, may then be placed on the top of the combination to hold the ferrite blocks and silver blank 50 in their assembled position. The end of the assembled ferrite blocks containing tab 54 is then placed at the bottom of a cylindrical mold in such a manner that the longitudinal axis of the assembled ferrite blocks and of the cylindrical mold are coincident. In addition, a relatively long bar having colinear ends and a center section which is bent to fit around the assembled ferrite blocks is placed in the cylindrical mold in such a manner that the center section does in fact fit around the assembled ferrite blocks while the colinear ends protrude from the cylindrical mold at opposite ends thereof. The colinear ends of the bar are aligned with the conductive gap in the assembled ferrite blocks so that if the gap is considered to be a plane the gap and the colinear ends lie in the same plane. The cylindrical mold is then filled with a resin mixture which comprises type Prec-2 Polly Kast with type "H" hardener in a 10 to 1 ratio, respectively. Both of the materials used in the resin mixture are commercially offered for sale by the Polly Resin Co., 11661 Wicks Street, Sun Valley, California.

When the resin hardens, the completed transducer head can be removed from the mold. As a final step in the fabrication process of transducer head 18, the head should be placed in a suitable jig or fixture, and an abrasive material should be employed to grind or polish the bottom side of the transducer head to insure that the recording gap between the two assembled ferrite blocks is flush with the bottom side of the transducer head. This final step insures that there will be a proper engagement between transducer head 18 and the magnetizable surface of drum 12 when the transducer head is subsequently mounted in contact therewith. It should be noted that the silver conductor between the ferrite cores serves to accurately space the blocks from each other as well as to provide a path for electrically energizing the recording head.

The completely fabricated transducer head 18 is positioned in transducer mounting bracket 24, as hereinbefore noted, and the two ends of conductive blank 50 are connected to the secondary winding of transformer 26 by means of flexible conductive strips 32 which are composed of solid silver ribbon, 2 mils in thickness. The flexible conductive strips are connected to the two ends of conductive blank 50 by means of a small dab of solder at the points of contact of the conductors.

Referring now to FIGS. 5*a* through 5*d*, there is shown the detailed structure of one type of transformer suitable for use as step-down transformer 26. As shown in FIG. 5*a*, the center-tapped primary winding 60 is wound on a bobbin 62 which in turn is positioned in a core 64 shown in FIG. 5*c*. A single turn secondary winding which in this embodiment of the invention comprises a conductive strip 66 of solid silver 5 mils in thickness is positioned within core 64 and is wrapped around bobbin 62, the ends of the conductive strip 66 protruding out of a break 68 in the wall of core 64. The ends of primary winding 60 protrude out of the side of bobbin 62, as shown in FIG. 5*a*. The final step in assembling transformer 26 is the placement of side 70 over the open area of core 64, the side having a break 72 therein. It is evident from the diagrams shown in FIG. 5*a* and 5*d* that the ends of primary winding 60 protrude out of break 72 in side 70 of the cup-core transformer. It should be noted that it is preferable to permanently position side 70 against cup-core 64 by cementing the two components together with Epon Adhesive No. 6, manufactured and sold by the Shell Chemical Co., New York, New York.

Figure 6A:
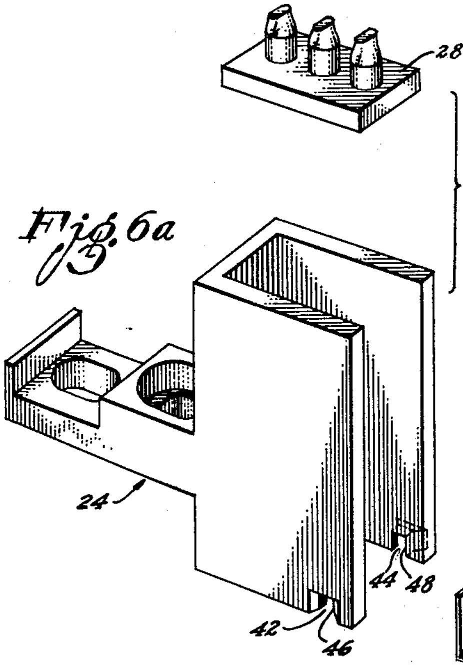
Figure 6B:
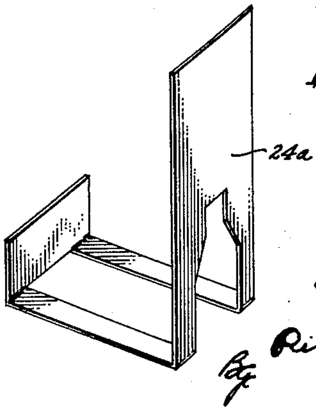

To better understand the assembly of the elements which constitute transducer 16, attention is directed to FIGS. 6*a* and 6*b* wherein there is shown transducer mounting bracket 24 and transducer mounting bracket cover 24*a*, respectively. In addition, there is shown in FIG. 6*a* terminal board 28. Examination of transducer mounting bracket 24 will reveal that grooves 42 and 44 are beveled inwards so that constraining surfaces 46 and 48 are narrow. It is desirable that the constraining surfaces be narrow since, as is hereinafter discussed, it is preferable that the pivot bars be pivotable about the constraining surface in order that transducer head 18 be better able to align itself axially with the surface of the drum.

With reference now to one suitable method of assembling transducer 16, step-down transformer 26 is positioned in transducer mounting bracket 24, as shown in FIG. 2. The ends of primary winding 60 of step-down transformer 26 are connected to the three terminals contained within terminal board 28 and the volume in transducer mounting bracket 24 between transformer 26 and the top of the mounting bracket is filled with Epon adhesive No. 6 in order to insure the proper positioning of the transformer and the terminal board and, in addition, to give strength to the ends of primary winding 60. Next, the two springs 30 are positioned in transducer mounting bracket 24. The cantilevered end of each of the springs 30 is embedded in a cavity in the transducer mounting bracket provided for this purpose, as shown in FIG. 2. Transducer head 18 is then electrically connected to secondary winding 66 of step-down transformer 24 by means of flexible conducting strips 32, as hereinbefore described. Transducer head 18 is positioned in transducer mounting bracket 24 by placing pivot bar 38 and 40 in grooves 42 and 44 of the transducer mounting bracket. Transducer mounting bracket 24*a* is positioned adjacent transducer mounting bracket 24 and cemented in place with Epon Adhesive No. 6, thereby locking pivot bar 38 and 40 in grooves 42 and 44, respectively. It is evident from the foregoing, that springs 30 will urge pivot bars 38 and 40 slidably against constraining surfaces 46 and 48 and also in a downward direction. At this point, magnetic transducer 16 is completely assembled and ready for mounting.

As one of the final adjustments to be made on transducer 16 after it has been mounted on transducer mounting station 14, is that transducer head 18 be aligned both axially and circumferentially by rotation of eccentric screws 20 and 22. It is apparent from the foregoing discussion that no further adjustment is necessary and that magnetic transducer 16, and thereby the magnetic drum system, is ready for operation after this final adjustment is made.

In operation, it is clear that rotation of drum 12 whose direction of rotation is indicated by the arrow in FIG. 2 will cause pivot bar 38 and 40 to be urged slidably against constraining surfaces 46 and 48. Furthermore, it is clear that springs 30 which rest slidably against pivot bars 38 and 40 will urge transducer head 18 against the magnetizable surface of the drum and also slidably against the constraining surfaces. It is apparent from FIG. 2, that constraining surfaces 46 and 48 are radially oriented as is the gap in the assembled ferrite blocks. It is furthermore evident from FIG. 2, that the constraining surfaces are located very close to the gap in the assembled ferrite blocks and that pivot bars 38 and 40 are located very near the locus of contact of the gap and the magnetizable surface of drum 12. Hence, since it is clear that head 18 is rotatable about the pivot bars, transducer head 18 is effectively rotatable about an axis which is almost coincident with the locus of contact of the gap and the surface of drum 12.

With reference now to FIGS. 2 and 3, it is evident that selectively one or both of pivot bars 38 and 40 are free to slide along the corresponding constraining surface so that transducer head 18 is circumferentially pivotable about either of the constraining surfaces and also is translationally movable in a radial direction. It is therefore evident that transducer head 18 is free to move in any manner necessary for it to remain orientated with respect to the surface of drum 12 so that the gap in the assembled ferrite blocks will be in contact with the magnetizable surface of the drum despite irregularities or run out in the drum even though the area of the bottom side of transducer 18 is large.

The effect of the gap being in contact with the magnatizable surface of the drum is evident, almost all the magnetic flux field generated by the energizing current which passes from one ferrite block to the other ferrite block is concentrated in the region immediately adjacent the gap of the head, since this is by far the lowest reluctance path presented the magnetomotive force. Therefore, the resolution provided by the head of the invention is exceptionally high compared to the resolution obtainable by prior art magnetic transducer heads.

It should be herein specifically mentioned that although the transducers utilized with magnetic drum memories of the invention are shown to include a transformer for energizing the recording head, it is obvious that a transducer head could be directly electrically connected to a pair of terminals on the transducer mounting bracket from which the head could be energized by direct current signals. The need for a transformer would be eliminated although the output impedance of the source energizing the recording head would have to be relatively low to match the low impedance of the single-turn conductor which creates the magnetic field in the head.

It should also be herein specifically noted that the transducer of the invention may be modified in any number of particulars which will be hereinafter made more evident. With reference to FIGS. *7a*, *7b* and *7c*, for example, there is shown another embodiment of the transducer of the invention which is particularly suited for use with magnetic drum memory systems wherein the magnetic drum has a relatively large amount of run-out or drum eccentricity.

More specifically, there is shown in FIGS. *7a*, *7b*, and *7c*, a transducer of the invention wherein the step-down transformer 26 of the first embodiment is modified in that a U-shaped secondary winding which passes through the ferrite core without contacting the core is utilized. Since the secondary winding does not contact the ferrite core at any point, the transducer head is free to move in its prescribed manner without any limitation being imposed by the secondary winding, thereby making this embodiment of the invention somewhat more suitable for highly eccentric drums where the transducer head must undergo relatively large movements in order to accommodate for the eccentricity of the drum.

As shown in FIG. *7a*, transducer mounting bracket 24 of this embodiment of the invention includes a transducer housing 74 and a pair of mounting blocks 76, the transducer housing being pivotably connected to the mounting blocks 76 in such a manner that the transducer housing is pivotable about axis A—A. As indicated in FIG. *7a*, transducer housing 74 is pivotably connected to mounting block 76 by means of a shaft running through the mounting blocks and the transducer housing colinearly with the pivot axis. Transducer mounting bracket 24 is mounted to one of transducer mounting stations 14 by means of a pair of screws or similar devices which pass through slots 78 located in the mounting blocks. It should be herein noted that the transducer mounting stations shown in FIG. 1 must be slightly modified in order to accept the transducer mounting bracket shown in FIG. *7a*. However, the changes necessary in the transducer mounting stations are slight and would be obvious to anyone skilled in the art so that a discussion of these slight changes herein is unnecessary.

When transducer 16 is mounted on transducer mounting station 14 transducer head 12 can be circumferentially aligned by a losing lock screw 77, which passes through a clearance hole in transducer housing 74, and moving the transducer housing about pivot axis A—A. The size of clearance hole 79 determines the limits of movement of transducer housing 74 about the pivot axis so that by proper selection of the size of clearance hole 79 the limits of movement of the transducer housing can be controlled. Therefore, it can be insured that the transducer cannot be moved into contact with the surface of drum 12. It should be noted that transducer 16 can be axially aligned by loosening the screws in slots 78 and moving the head axially.

Referring now to FIG. *7b*, there is shown a bottom view of the magnetic transducer shown in FIG. *7a*. As shown in *7b*, the gap in the assembled ferrite blocks of the transducer head 18 is positioned in a plane which includes line A—A and is perpendicular to the bottom side of transducer mounting bracket 24. As indicated in FIG. *7b*, springs 30 are counter-sunk in a pair of grooves 80 which extend almost the full length of the bottom side of the transducer mounting bracket 24. In order to ascertain the detailed structure of transducer 16 of the second embodiment of the invention attention is directed to FIG. *7c*.

Referring now to FIG. *7c*, there is shown transducer head 18, transformer 26, a cylindrically shell shaped shield 82 and springs 30 shown as they are positioned in a cavity 86 of housing 74. As shown in FIG. *7c*, transducer head 18 comprises a washer 84 which has the assembled ferrite blocks positioned therein in such a manner that the bottom side of the assembled ferrite blocks having the gap therein is flush with the bottom side of washer 84. The assembled ferrite blocks should be rigidly cemented to washer 84 by any one of a number of suitable cements. One such suitable type of cement is Hysol Base Resin which is mixed with Hysol hardener as directed, both products being manufactured by the Houghton Laboratories, Olean, New York. It should be herein noted that washer 84 may be fabricated from any one of the many types of linen base phenolic materials known in the art and commercially available from a number of different sources.

As shown in FIG. *7c*, colinear pivot bars 38 and 40 are in this embodiment of the invention constructed from two separate pieces of material. In construction of transducer head 18 the two pieces of material comprising the bars 38 and 40 are positioned adjacent washer 84 so that the two bars are colinear and protrude slightly out on opposite sides of the washer. The two bars are held in place by a cement such as Epon Adhesive No. 6.

Figure 7A:
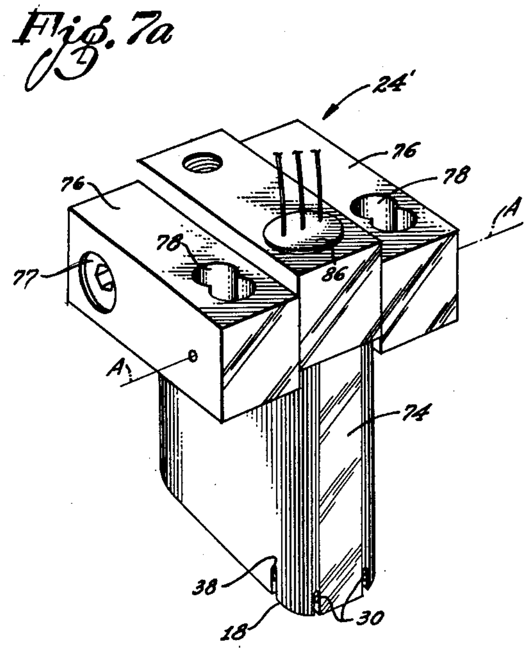
Figure 7C:
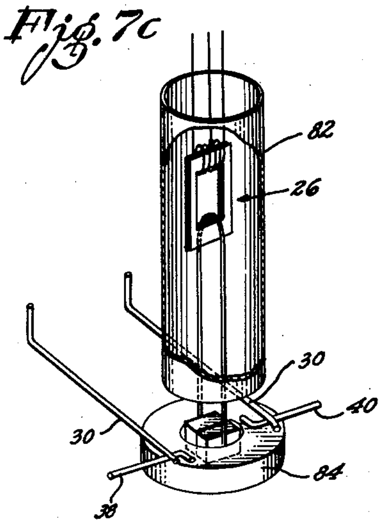
Figure 7B:
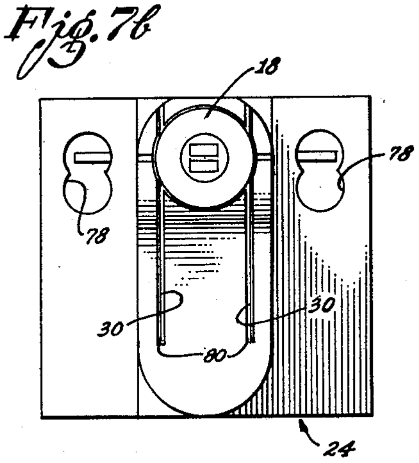

As shown in FIG. 7c, secondary winding 66 of transformer 26 is a rigid U-shaped bar composed of conductive material, such as copper. The two legs of the secondary winding are connected to the two ends of blank 50 by means of a dab of solder. As shown in FIG. 7c, the ferrite core of transformer 26 has an aperture therein and the base region of secondary winding 66 passes through the aperture without contacting the ferrite core. The secondary winding 66 is wound on the ferrite core and the ends of the winding extend up and out of the transducer at cavity 86 in transducer mounting bracket 24, as shown in FIG. 7a. In order to shield the area surrounding the magnetic transducer 16 cylindrical shield 82, preferably fabricated from a thin silver sheet, is positioned around step-down transformer 26. To simplify the description of the invention cylindrical shield 82 is depicted as being transparent, however, it is clear that in reality the cylindrical shield is opaque. As in the first embodiment of the invention, one of the springs 30 is positioned above and slidably against pivot bar 38 while the other of the springs is positioned in a similar manner against pivot bar 40.

In order to insure the proper positioning of the elements of transducer 16 in cavity 86, and to give the ends of primary winding 60 additional support it is desirable that cavity 86 be partially filled with a resin cement, such as the Hysol Resin, hereinbefore mentioned.

In operation, this embodiment of the invention is similar to that of the first embodiment except that springs 30 do not urge pivot bars 38 and 40 against constraining surfaces 46 and 48 but are used only to urge the pivot bars and the transducer head against the magnetizable surface of drum 12. In this embodiment of the invention it is left for the frictional force due to the drag on the bottom side of transducer head 18 caused by the rotating drum, to position pivot bars 38 and 40 slidably against constraining surfaces 46 and 48 so that transducer head 18 is fixed at a predetermined circumferential position. As hereinbefore discussed, the aperture in the ferrite core of transformer 26 is large enough so that as transducer head 18 moves to accommodate for the variations or irregularities in the surface of drum 12, secondary winding 66 at no time contacts the ferrite core. Hence, the secondary winding will in no way be a restriction upon the movement of the transducer head and the transducer head will be better able to accommodate for relatively large drum surface irregularities.

It is to be expressly understood, of course, that the basic concepts herein taught can be embodied in different structures from the specific structures shown without departing from the spirit and scope of the invention. For example, the transducer of the invention can be modified, as previously indicated, so that it may be energized from a source of direct current signals. On the other hand, if transformer coupling is desired, a transformer other than the specific type shown and described can be employed without departing from the invention. Accordingly, it is to be understood that the spirit and scope of the invention is to be limited only by the scope of the appended claims.

What is claimed as new is:

1. In a magnetic memory system responsive to an applied electric signal for recording the applied electric signal, the applied electrical signal representing intelligence information, the combination comprising: a rotatable drum having a magnetizable periphery; frame means positioned adjacent said drum; first means mounted on said frame for rotating said drum; a transducer mounting station connected to said frame, said station being contiguous with said magnetizable periphery of said drum; a magnetic transducer including a transducer mounting bracket coupled to said transducer mounting station and a transducer head having a gap therein and a bottom side, said gap intersecting said bottom side along a gap line; second means for urging said bottom side of said transducer head against said drum; third means for connecting said transducer head to said transducer mounting bracket to permit said transducer head to rotate about an axially oriented axis and a circumferentially oriented axis and to move radially in response to contact with the drum periphery whereby said gap line remains in contact with said magnetizable periphery despite irregularities therein; constraining means for constraining said transducer head from circumferential movement; said constraining means including a member supported on the magnetic head and stop means affixed with respect to the transducer and cooperating with said member to prevent circumferential movement of said head, and first coupling means for adjustably positioning said transducer mounting bracket to said transducer mounting station whereby said transducer is circumferentially adjustable with respect to said drum.

2. The combination defined in claim 1 wherein said transducer head is a single-turn contact head including a high permeability U-shaped ferromagnetic core, the legs of said core being spaced apart a predetermined distance by said gap and a ribbon-like electrical conductor substantially filling said gap, said ribbon-like electrical conductor having first and second ends, said first end covering a portion of one of the legs of said core and said second end covering a portion of the other of the legs of said core.

3. In a magnetic memory system the combination comprising: a rotatable drum having a magnetizable periphery; frame means positioned adjacent said drum; means mounted on said frame for rotating said drum; a transducer mounting station connected to said frame, said station being contiguous with said magnetizable periphery of said drum; a magnetic transducer including a transducer mounting bracket coupled to said transducer mounting station and a transducer head having a bottom side with a gap line thereon in slidable contact with said magnetizable periphery, said transducer mounting bracket having first and second constraining surfaces lying substantially in a first plane, said first plane being substantially radially oriented and located in the direction of rotation of the drum with respect to said gap point; first and second elongated members affixed to said transducer head and whose axes are positioned in a second plane, said second plane being substantially parallel to said first plane and including said gap line therein, said elongated members being slidably urged against said constraining surfaces by the drag of said rotatable drum; first and second springs connected to said transducer mounting bracket and slidably positioned against said first and second elongated members respectively, for urging said gap line against said magnetizable surface of said drum and for permitting said transducer head to be rotatable thereby allowing said transducer head to accommodate for axial surface variations.

4. The combination defined in claim 3 wherein said transducer head is potted in an epoxy foot whereby the area of said bottom side is substantially increased and said magnetic transducer further includes a transformer having a primary and a secondary winding, and coupling means including flexible conductors for electrically coupling said secondary winding to said transducer head.

5. In a magnetic memory system for storing information contained in a plurality of applied electrical signals, the combination comprising: a rotatable drum having a magnetizable periphery; frame means positioned adjacent said drum; means mounted on said frame means for rotating said drum; a plurality of transducer mounting stations connected to said frame means and spaced around said drum, said stations being contiguous with said magnetizable periphery of said drum; a magnetic transducer including a transducer mounting bracket having first and second constraining surfaces and a transducer head having a bottom side with a gap thereon; first and second pivot bars affixed to said transducer head; first and second springs, one end of each of said springs connected to said transducer mounting bracket, said first and second springs slidably positioned against said first and second pivot bars, respectively, for urging said gap against said magnetizable periphery, said first and second constraining surfaces being substantially radially oriented and positioned in the direction of drum rotation with respect to said first and second pivot bars whereby said transducer head is constrained from circumferential motion and is free to move radially as well as rotate about axially and circumferentially oriented axes; means for adjustably fastening said transducer to a preselected one of said transducer mounting stations, said transducer being circumferentially adjustable; a transformer including a primary winding to which are applied the electrical signals, a rigid single turn secondary winding and a ferrite core having an aperture therein, said single turn secondary winding passnig through said aperture without contacting said ferrite core; and coupling means coupling said secondary winding to said transducer head whereby said transducer head is electrically connected without losing any of its freedom of motion.

6. In a magnetic drum memory system for storing as magnetic cells applied electrical signals, the magnetic drum memory system including a rotatable drum having a magnetizable surface, a magnetic transducer comprising: transducer mounting means positioned adjacent the magnetizable surface of the drum; a transducer head including first and second electrical terminals and having a bottom side with a gap line therein in contact with the magnetizable surface of the drum; constraining means coupled to said transducer mounting means for constraining said transducer head from circumferential movement and for permitting said transducer to move radially in response to contact with said drum periphery; said constraining means including a member supported on the transducer head and stop means affixed with respect said transducer mounting means and cooperating with said member to prevent circumferential movement of said head, first means pivotably coupling said transducer head and said constraining means, said first means being operable for permitting said transducer head to rotate about first and second pivot axes in response to contact with said drum periphery, said first pivot axis being substantially axially oriented and said second axis being substantially circumferentially oriented; a transformer including primary and secondary windings, the applied electrical signals being applied across said primary winding, and coupling means for coupling said secondary winding to said first and second electrical terminals.

7. In a magnetic memory system, the combination comprising: a rotatable drum having a magnetizable periphery; frame means positioned adjacent said drum; means mounted on said frame for rotating said drum; a transducer mounting station connected to said frame, said station being contiguous with said magnetizable periphery of said drum; a magnetic transducer including a transducer mounting bracket coupled to said transducer mounting station and a transducer head having a bottom side with a gap line thereon in slidable contact with said magnetizable periphery, said transducer mounting bracket having first and second constraining surfaces lying in a first plane, said first plane being substantially orthogonal to a plane tangent to said magnetizable periphery at said gap line; first and second bars whose axes are positioned in a second plane substantially parallel to said first plane connecting means; connecting said bars to said transducer head; and first and second springs connected to said transducer mounting bracket and slidably positioned against said first and second bars, respectively, for urging said gap line against said magnetizable periphery and for slidably positioning said first and second bars against said first and second constraining surfaces, respectively, whereby said transducer head is radially movable and rotatable about axially and circumferentially oriented axes thereby allowing said gap line to contact said magnetizable periphery despite irregularities therein.

8. In a self aligning magnetic transducer mounted on a transducer mounting station for reading and writing intelligence on the surface of the magnetic drum in response to an electrical signal, a portion of the transducer being radially movable and rotatable about axes axially and circumferentially oriented with respect to the drum, the combination comprising: a transducer mounting bracket coupled to the mounting station, said transducer mounting bracket having a constraining surface lying substantially in a first plane; a transducer head having first and second electrical terminals and a bottom side with a gap line thereon in slidable contact with the surface of the magnetic drum, said first plane including said gap line and being substantially radially oriented; a bar affixed to said transducer head for positioning said transducer head, said bar being slidably positioned against and constrained by said constraining surface to prevent circumferential movement of the head, spring means slidably positioned against said bar for urging said bottom side of said transducer head against the surface of said drum whereby said bar is restrained from circumferential movement by said constraining surface and the drag, created by the moving drum.

References Cited in the file of this patent

UNITED STATES PATENTS

| | | |
|---|---|---|
| 2,772,135 | Hollabaugh et al. | Nov. 27, 1956 |
| 2,820,688 | Philbrick | Jan. 21, 1958 |
| 2,854,525 | Quade | Sept. 30, 1958 |
| 2,862,064 | Wallace | Nov. 25, 1958 |
| 2,863,002 | Brower | Dec. 2, 1958 |
| 2,864,892 | Perkins | Dec. 16, 1958 |
| 2,927,163 | Brower | Mar. 1, 1960 |
| 2,931,691 | Curtis et al. | Apr. 5, 1960 |
| 2,950,354 | Hohnecker | Aug. 23, 1960 |
| 3,055,987 | Ricketts | Sept. 25, 1962 |

FOREIGN PATENTS

| | | |
|---|---|---|
| 793,237 | Great Britain | Apr. 9, 1958 |